(12) United States Patent
Brown et al.

(10) Patent No.: US 7,827,735 B1
(45) Date of Patent: Nov. 9, 2010

(54) LIFTGATE ASSEMBLY FOR AUTOMOTIVE VEHICLE

(75) Inventors: Mark Brown, New Hudson, MI (US);
Daniel Bejune, Southfield, MI (US);
Leonard Shaner, New Baltimore, MI (US)

(73) Assignee: Ford Global Technologies, Dearborn, MI (US)

( * ) Notice: Subject to any disclaimer, the term of this patent is extended or adjusted under 35 U.S.C. 154(b) by 1069 days.

(21) Appl. No.: 11/162,774

(22) Filed: Sep. 22, 2005

(51) Int. Cl.
*E05B 65/06* (2006.01)
(52) U.S. Cl. .............................. 49/394; 49/397; 49/501
(58) Field of Classification Search ................... 49/501, 49/394, 397
See application file for complete search history.

(56) References Cited

U.S. PATENT DOCUMENTS

| | | | | |
|---|---|---|---|---|
| 1,689,472 A | * | 10/1928 | Barrows | 49/501 |
| 2,890,880 A | * | 6/1959 | Hompe et al. | 267/140 |
| 3,011,816 A | * | 12/1961 | Van Noord | 292/111 |
| 3,184,263 A | * | 5/1965 | Plegat | 49/501 |
| 3,876,238 A | | 4/1975 | Watermann | |
| 3,887,227 A | | 6/1975 | Deckert | 296/187.12 |
| 4,599,843 A | * | 7/1986 | Ingvarsson | 52/735.1 |
| 5,094,034 A | * | 3/1992 | Freeman | 49/501 |
| 5,172,946 A | | 12/1992 | Dowling | |
| 5,267,742 A | * | 12/1993 | Reinkemeyer | 280/79.3 |
| 5,295,374 A | * | 3/1994 | Bender et al. | 70/208 |
| 5,314,228 A | * | 5/1994 | Figge, Sr. | 296/146.6 |
| 5,328,219 A | | 7/1994 | Konchan et al. | |
| 5,535,841 A | | 7/1996 | Cobes, Jr. et al. | |
| 5,538,094 A | | 7/1996 | Cobes, Jr. et al. | |
| 5,806,917 A | * | 9/1998 | Townsend | 296/202 |
| 5,879,046 A | * | 3/1999 | Kalis, Jr. | 296/146.5 |
| 5,909,937 A | * | 6/1999 | Jenkins et al. | 312/405.1 |
| 5,944,373 A | * | 8/1999 | Seksaria et al. | 296/57.1 |
| 6,019,418 A | | 2/2000 | Emerling et al. | |
| 6,302,472 B1 | * | 10/2001 | Rahmstorf et al. | 296/146.5 |
| 6,554,345 B2 | * | 4/2003 | Jonsson | 296/146.6 |
| 6,659,538 B2 | * | 12/2003 | Scheid | 296/146.8 |
| 6,676,187 B1 | * | 1/2004 | Miskech et al. | 296/50 |
| 6,968,650 B2 | * | 11/2005 | Seksaria et al. | 49/502 |
| RE39,729 E | * | 7/2007 | Miskech et al. | 296/50 |
| 2003/0110705 A1 | * | 6/2003 | Hlavach et al. | 49/501 |

OTHER PUBLICATIONS

Hawley's Condensed Chemical Dictionary, 14$^{th}$ edidtion, published by John Wiley & Sons, Inc. 2001, p. 901.*
Dictionary.com definition of word "skeleton", http://dictionary.reference.com/browse/skeleton.*

* cited by examiner

*Primary Examiner*—Katherine W Mitchell
*Assistant Examiner*—Catherine A Kelly
(74) *Attorney, Agent, or Firm*—Jerome R. Drouillard; Greg Brown

(57) ABSTRACT

A liftgate assembly for an automotive vehicle includes an outer panel having an external periphery and a skeletonized, trussform inner panel joined to the outer panel at their mutual external peripheries. A latch assembly is mounted within a latch cavity defined by a section of the trussform inner panel and a facing portion of the outer panel. At least one standoff structure is interposed between the outer panel and the inner panel at a location adjacent to the latch cavity so as to resist deformation of the outer panel and consequent reduction in size of the latch cavity in the event that an impact is imposed upon the outer panel at a location near the latch cavity.

2 Claims, 3 Drawing Sheets

LIFTGATE ASSEMBLY FOR AUTOMOTIVE VEHICLE

TECHNICAL FIELD

The present invention relates to a liftgate for an automotive vehicle having a latch mechanism which is functionally protected from the adverse effect of impacts applied externally upon the liftgate in the region of the latch.

DISCLOSURE INFORMATION

Remotely actuated latch mechanisms used with liftgates and other types of vehicular doors typically include a latch and an operating rod which connects the latch to a remotely located handle. If a vehicle having this type of latch configuration is involved in a collision, it may be possible for the latch to become unlatched if the exterior surface of the door within which the latch is mounted becomes severely deformed and impinges upon either the latch itself or upon the operating rod extending between the latch and handle. The present reinforcement system is intended to resist such severe deformation of the liftgate outer panel in a localized region around the latch itself. The system according to the present invention stands in contrast to structures shown in U.S. Pat. Nos. 5,535,841 and 5,538,094, which disclose large-scale reinforcements apparently intended to provide beam strength to automotive body closure panels, but at the expense of additional tooling cost, excessive weight gain, unwanted complexity, and less than optimal function.

SUMMARY OF THE INVENTION

A liftgate assembly for an automotive vehicle includes an outer panel having an external periphery, and a trussform inner panel joined to the outer panel at the external periphery of the outer panel. A plurality of hinges is attached to the inner panel. A latch cavity defined by a section of the trussform inner panel and a facing portion of the outer panel is located at a position which is opposite the location of the hinges. A latch assembly is mounted within the latch cavity. At least one standoff structure is interposed between the liftgate's outer panel and inner panel at a location adjacent to the latch cavity. The standoff structure is positioned so as to resist both plastic and elastic deformation of the outer panel and a consequent reduction in the size of the latch cavity in the event that an impact is imposed on the outer panel at a location proximate to the latch cavity.

According to an aspect of the present invention, a standoff structure may include a solid block slidably engaged with the outer panel and fastened to the inner panel. The block can be mechanically or adhesively fastened to the inner panel or to the outer panel. In a preferred embodiment, the standoff structure block may comprise solid polypropylene.

In essence, the inner panel may be considered to be a skeletonized structure bearing a plurality of chord members, with a plurality of structural reinforcements interposed between the outer panel and the chord members at locations adjacent to the latch cavity, and with the reinforcements being positioned so as to resist crushing of the latch cavity in the event an impact is imposed upon the outer panel at a location proximate to the latch cavity.

A standoff structure according to the present invention is preferably sized so as to have a clearance space between the outer panel and the standoff structure after the reinforcement has been installed. This prevents shadowing of the standoff structure in the outer panel of the vehicle.

It is an advantage of the present invention that the present reinforcement system resists translational movement of the latch assembly with respect to the latch release handle.

It is a further advantage of the present invention that integrity of the latch cavity is maintained by sharing impact loads between the outer door panel and the trussform inner panel.

It is a further advantage of the system according to the present invention that a standoff is achieved between the outer and inner panels of a door or liftgate assembly at low cost and with minimum weight increase to the panel or door assembly.

Other advantages, as well as features and objects of the present invention will become apparent to the reader of this specification.

DETAILED DESCRIPTION OF PREFERRED EMBODIMENTS

Figure 1:
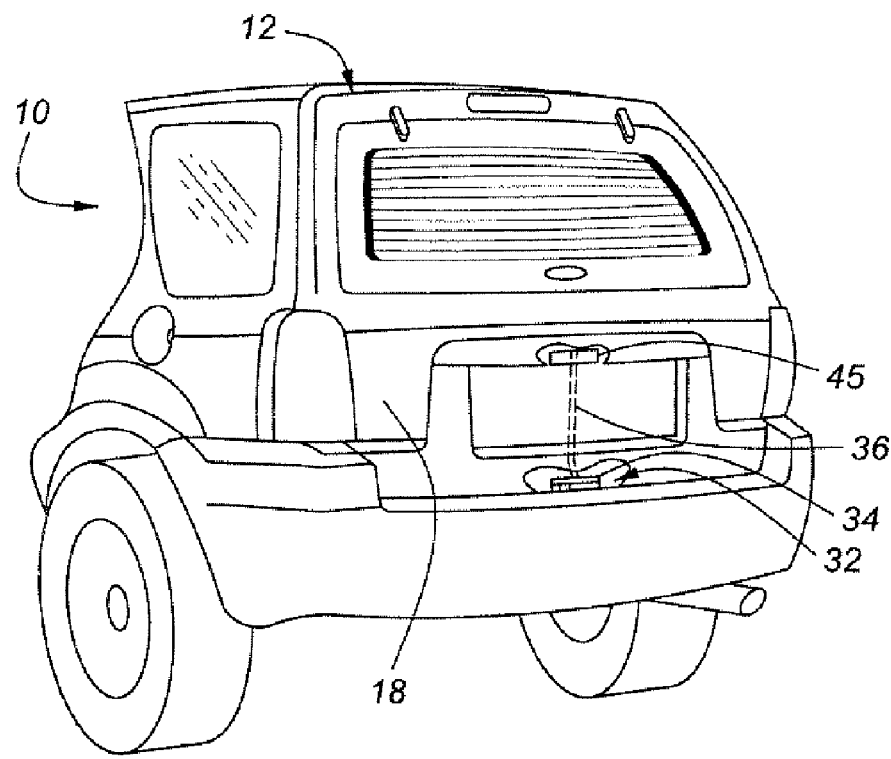
FIG. 1 is a perspective view of a vehicle having a liftgate according to the present invention.

As shown in FIG. 1, vehicle 10 has liftgate 12, which includes an outer panel 18, latch release handle 45, and latch 34 which is housed within a latch cavity 32. Operating rod 36 extends between release handle 45 and latch 34.

Figure 2:
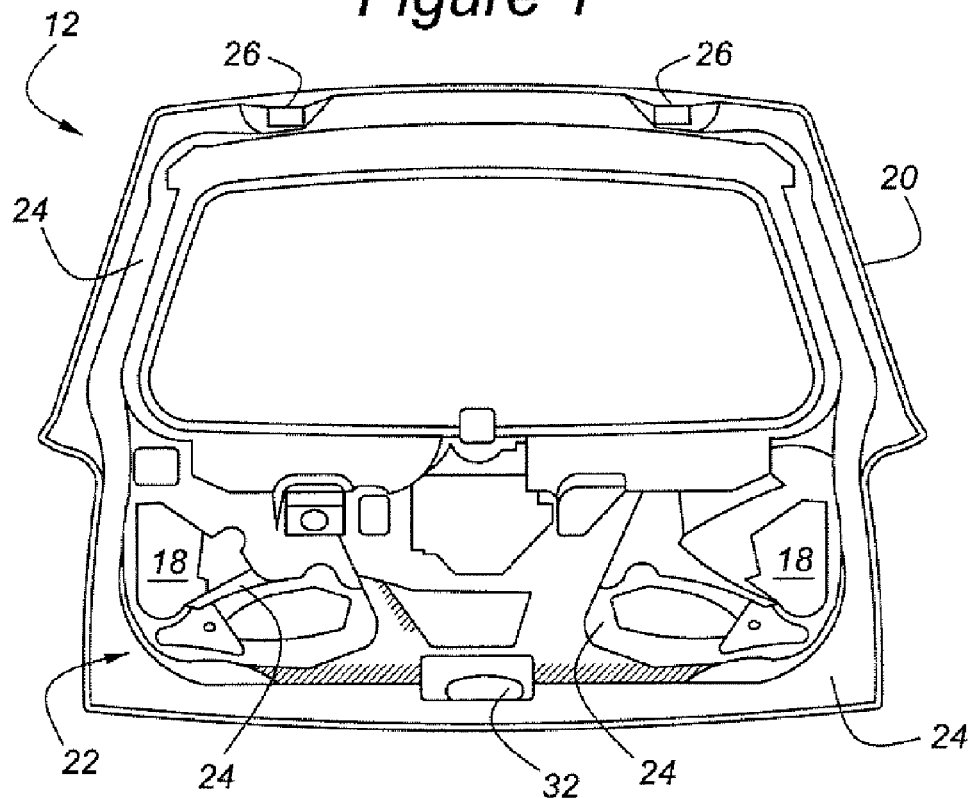
FIG. 2 is a perspective view of an inside portion of the liftgate shown in FIG. 1.

As shown in FIG. 2, liftgate assembly 12 has two major components: outer panel 18 and inner panel 22. Inner panel 22 includes a number of chord members, 24, which are unitary with panel 22. In essence, inner panel 22 is a trussform because of the skeletonized, triangulated nature of chord members 24. Inner panel 22 is attached at its outer periphery to the external periphery 20 of outer panel 18. This attachment may be in the form of a hemmed joint or other type of joint produced by any of several joining processes known to those skilled in the art and suggested by this disclosure. Hinges (not shown) are attached to inner panel 22 at pads 26 to permit operation of unit 12 as a door or liftgate.

Figure 3:
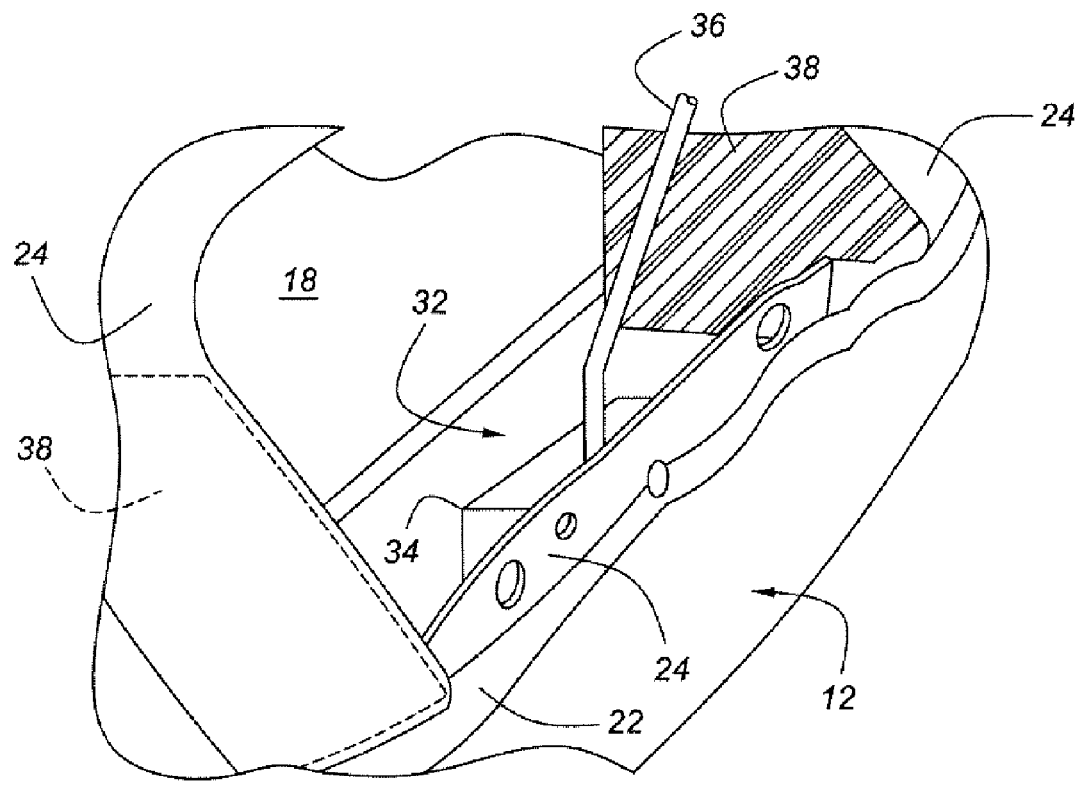
FIG. 3 is an enlarged perspective view of a latch portion of the liftgate shown in FIGS. 1 and 2.
Figure 4:
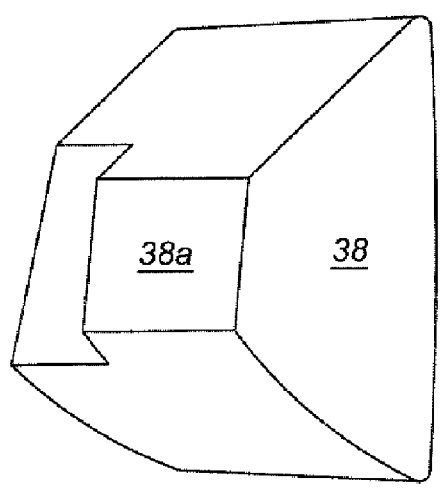
FIG. 4 is a perspective view of a standoff structure according to one aspect of the present invention.
Figure 5:
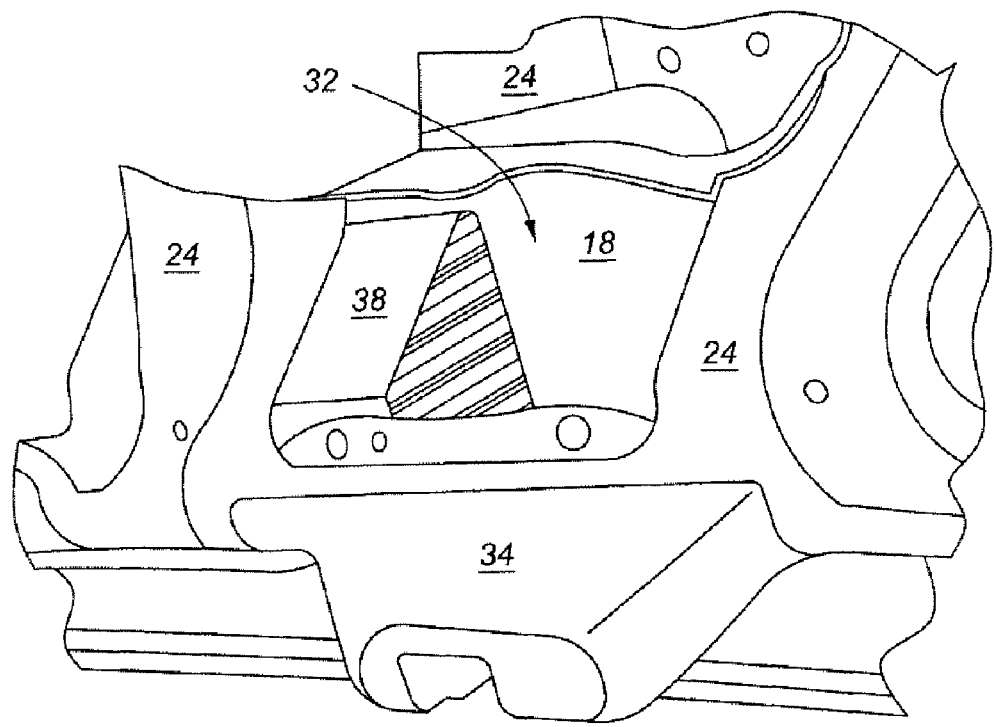
FIG. 5 illustrates a standoff structure being installed in a liftgate according to the present invention.

As shown in FIGS. 3 and 5, latch 34 of liftgate 12 is housed within latch cavity 32. Latch cavity 32 is defined by trussform chord members 24 and by facing portions of outer panel 18. One or two standoff structures 38 are positioned between facing members 24 and outer panel 18. One such member is shown in each of FIGS. 3 and 5, (an additional member 38 is shown in phantom in FIG. 3). Standoff structure 38 is shown alone in FIG. 4.

Each of standoff structures 38, as illustrated in FIGS. 3 and 4, is a solid, truncated, pyramidal block of material, preferably a plastics composition such as polypropylene, which is slidably engaged within pockets defined between outer panel 18 and chord members 24 of inner panel 22. This slidable engagement is shown with particularity in FIG. 5, wherein one of the structures 38 is shown as being partially engaged with a pocket formed by one of chord members 24 and by panel 18.

Standoff structures 38 are sized and placed so as to resist plastic deformation of outer panel 18 and the consequent reduction in size of latch cavity 32 in the event that an impact is imposed upon the outer portion of panel 18. This will prevent latch operating rod 36 (FIG. 3) from being impacted by panel 18, which could have the effect of impairing the operation of latch 34.

For esthetic reasons, it is necessary that standoff structures 38, when fastened to inner panel 22, be sized so as to have a clearance space extending between outer panel 18 and the adjacent surface, (38*a*, FIG. 4) of structure 38 itself. This clearance prevents the outline of the base of standoff structure 38 from being telegraphed through panel 18 because of deformation of panel 18 caused by structure 38. The clearance also prevents squeaks or other noises which could be caused by rubbing between structure 38 and outer panel 18. If standoff structure 38 is attached to outer panel 18, a clearance must be established between the inner panel 22 and structure 38, for the previously cited reasons.

It has been determined that a small clearance space will not materially inhibit structure 38 from providing resistance to crushing of latch cavity 32 in the event an impact is imposed upon outer panel 18 at a position near latch cavity 32. As noted above, structures 38 also resist translational movement of latch 34 in a direction which could cause latch 34 to open as a result of deformation of outer panel 18. Those skilled in the art will appreciate in view of this disclosure that structures 38 may be either mechanically or adhesively fastened to inner panel 22 or adhesively fastened to either inner panel 22 or to outer panel 18. Those skilled in the art will appreciate further that structures 38 may be constructed of other plastic or metallic, or non-metallic, or composite materials known to those skilled in the art and suggested by this disclosure and having the necessary column strength to serve as columnar reinforcements in the manner described herein.

Although the present invention has been described in connection with particular embodiments thereof, it is to be understood that various modifications, alterations, and adaptations may be made by those skilled in the art without departing from the spirit and scope of the invention set forth in the following claims. For example, the present invention may be employed with not only the illustrated liftgate, but also with many other types of automotive doors. And, the configuration of standoff structures 38 may readily be adapted to suit any particular automotive door to which the present invention is being applied.

What is claimed is:

1. A door assembly for an automotive vehicle, comprising:
an outer panel having an external periphery;
a skeletonized inner panel comprising a plurality of chord members, with said inner panel being joined to said outer panel at said external periphery of said outer panel;
a plurality hinge pads formed in said inner panel;
a latch cavity defined by a plurality of said chord members and facing portions of said outer panel, with said cavity being located at a position which is opposite the location of said plurality of hinge pads;
a latch assembly mounted within said latch cavity; and
a plurality of structural reinforcements interposed between said outer panel and said chord members at locations adjacent said latch cavity, with said reinforcements being positioned so as to resist crushing of said latch cavity in the event that an impact is imposed upon said outer panel proximate the latch cavity, wherein each of said reinforcements comprises a solid block placed within a pocket defined by said outer panel and said inner panel, with said block being fastened to said outer panel and sized so as to have a clearance space between said inner panel and said block.

2. A door assembly for an automotive vehicle, comprising:
an outer panel having an external periphery;
a skeletonized inner panel comprising a plurality of chord members, with said inner panel being joined to said outer panel at said external periphery of said outer panel;
a plurality hinge pads formed in said inner panel;
a latch cavity defined by a plurality of said chord members and facing portions of said outer panel, with said cavity being located at a position which is opposite the location of said plurality of hinge pads;
a latch assembly mounted within said latch cavity; and
a plurality of structural reinforcements interposed between said outer panel and said chord members at locations adjacent said latch cavity, with said reinforcements being positioned so as to resist crushing of said latch cavity in the event that an impact is imposed upon said outer panel proximate the latch cavity, wherein each of said reinforcements comprises a solid block placed within a pocket defined by said outer panel and aid inner panel, with said block being fastened to said inner panel and sized so as to have a clearance space between said outer panel and said block.

\* \* \* \* \*